United States Patent [19]
Gotoh et al.

[11] Patent Number: 5,688,420
[45] Date of Patent: Nov. 18, 1997

[54] LOW-HYDROGEN-TYPE COVERED ARC WELDING ELECTRODE FOR HIGH STRENGTH CR-MO STEELS

[75] Inventors: Akinobu Gotoh; Takeshi Nakagawa, both of Fujisawa, Japan

[73] Assignee: Kabushiki Kaisha Kobe Seiko Sho, Kobe, Japan

[21] Appl. No.: 724,828

[22] Filed: Oct. 2, 1996

[30] Foreign Application Priority Data

Oct. 18, 1995 [JP] Japan ................................. 7-269603
Jul. 26, 1996 [JP] Japan ................................. 8-198123

[51] Int. Cl.$^6$ ............................................. B23K 35/22
[52] U.S. Cl. .............................. 219/145.23; 219/146.23
[58] Field of Search .......................... 219/145.23, 146.1, 219/146.22, 146.23

[56] References Cited

U.S. PATENT DOCUMENTS 4,503,129  3/1985  Okuda et al. ................ 219/145.23
4,994,647  2/1991  Tanaka et al. ................ 219/145.23

Primary Examiner—Clifford C. Shaw
Attorney, Agent, or Firm—Oblon, Spivak, McClelland, Maier & Neustadt, P.C.

[57] ABSTRACT

A low-hydrogen-type covered arc welding electrode for high-strength Cr—Mo steels comprising a core wire and a covering material, is characterized in that the contents of components and impurities in the covered arc welding electrode are specified, the water content in the entire welding electrode is controlled to 50 to 600 ppm by weight, and the basicity BL of the covering material expressed by the following equation is controlled to 2.0 to 8.0: $(BL = ([CaO]_f + [MgO]_f + [BaO]_f + [CaF_2]_f + [Na2O]_f + [K_2O]_f + 0.5 \times ([FeO]_f + [MnO]_f))/([SiO_2]_f + 0.5 \times ([Al_2O_3]_f + [TiO_2]_f + [ZrO_2]_f)))$, wherein $[Y]_f$ represents a content of chemical component Y in the covering material by weight percent to the total weight of the covering material.

1 Claim, 1 Drawing Sheet

LOW-HYDROGEN-TYPE COVERED ARC WELDING ELECTRODE FOR HIGH STRENGTH CR-MO STEELS

BACKGROUND OF THE INVENTION

1. Field of the Invention

The present invention relates to a low-hydrogen-type covered arc welding electrode for high strength Cr—Mo steels, which is used for welding of high-temperature and/or high pressure vessels, endows weld metal with excellent mechanical properties, and can prevent cold cracking and reheat cracking.

2. Description of the Related Art

Steel sheet materials, such as 2.25Cr—1Mo steel and 3Cr—1Mo steel, have been used for desulfurizers for petroleum refining and pressure vessels for coal liquefaction. In such plants, the operation has been carried out at a higher temperature and/or higher pressure due to economies of scale of the equipment and the increased efficiency. When the equipment is built with conventional steel materials, the plate thickness of the equipment must be extremely increased and the plate is occasionally deteriorated by hydrogen attack. Thus, new materials have been required instead of 2.25Cr—1Mo steel and 3Cr—1Mo steel in order to achieve the design of such equipment. Further, in boilers for generators, the development of high-strength Cr—Mo steels is required in order to improve the generating efficiency. Steel materials and welding materials for satisfying such demands have been developed and the part of such materials has been utilized. For example, Japanese Unexamined Patent No. 62-137196 discloses a covered arc welding electrode having excellent low-temperature toughness and providing high-strength weld metal. The improvement in the strength and toughness is achieved by suppressing the oxygen content in the weld metal and forcibly adding Nb and V. Further, Japanese Examined Patent No. 5-5599 discloses a covered arc welding electrode which enhances the creep rupture strength of the weld metal. The C, Mn and Ni contents are restricted and the component is adjusted in view of the yield into the weld metal, in order to improve the high-temperature properties.

In such prior art techniques, however, weld defects readily occur although low-temperature toughness and high-temperature strength are excellent. Welding procedures requires not only excellent mechanical properties of the weld metal, but also the decrease in welding defects as much as possible. Prior art techniques are directed to the improvement in the mechanical properties, and are inactive in the decreased weld defects. Especially, in the high-strength Cr—Mo steels, cold cracking can readily occur due to its high-strength, and reheat cracking will also readily occur because of its components.

SUMMARY OF THE INVENTION

It is an object of this invention to provide a low-hydrogen-type covered arc welding electrode for high-strength Cr—Mo steels, which endows weld metal with excellent mechanical properties, and can prevent cold cracking and reheat cracking.

A low-hydrogen-type covered arc welding electrode for high-strength Cr—Mo steels in accordance with the present invention comprising a core wire and a covering material, is characterized in that the contents of components in the covered arc welding electrode satisfy the following correlations:

$[Si]_w + K \times [Si]_f$: 0.35 to 2.4 weight percent,
$[Mn]_w + K \times [Mn]_f$: 0.5 to 2.0 weight percent,
$[Cr]_w + K \times [Cr]_f$: 2.0 to 4.0 weight percent,
$[Mo]_w + K \times [Mo]_f$: 0.01 to 1.5 weight percent,
$[V]_w + K \times [V]_f$: 0.15 to 0.60 weight percent, and
$[C]_w + K \times [C]_f$: 0.15 weight percent or less;

the covered arc welding electrode further contains at least one group of components selected from the groups consisting of (Ti, $TiO_2$, Zr, and Hf), (Nb and Ta), Ni, Co, W, and (B and $B_2O_3$), so as to satisfy the following correlations:

$[Ti]_w + [Zr]_w + [Hf]_w + K \times ([Ti]_f + 0.02 \times [TiO_2]_f + [Zr]_f + [Hf]_f)$: 0.005 to 0.500 weight percent, $[Nb]_w + [Ta]_w + K \times ([Nb]_f + [Ta]_f)$: 0.005 to 0.200 weight percent, $[Ni]_w + K \times [Ni]_f$: 0.10 to 1.00 weight percent,
$[Co]_w + K \times [Co]_f$: 0.10 to 1.00 weight percent,
$[W]_w + K \times [W]_f$: 0.10 to 2.50 weight percent, and
$[B]_w + K \times ([B]_f + 0.12 \times [B_2O_3]_f)$: 0.002 to 0.1 weight percent;

wherein $[X]_w$ represents a content of chemical component X in the core wire by weight percent to the total weight of the core wire, $[Y]_f$ represents a content of chemical component Y in the covering material by weight percent to the total weight of the covering material, and K equals to $t/(1-t)$ wherein t is a covering rate which represents a weight ratio of the covering material to the welding electrode per unit length; and the water content in the entire welding electrode is controlled to 50 to 600 ppm by weight, the basicity BL of the covering material expressed by the following equation is controlled to 2.0 to 8.0:

$$BL = ([CaO]_f + [MgO]_f + [BaO]_f + [CaF_2]_f + [Na2O]_f + [K_2O]_f + 0.5 \times ([FeO]_f + [MnO]_f)) / ([SiO_2]_f + 0.5 \times ([Al_2O_3]_f + [TiO_2]_f + [ZrO_2]_f)),$$

and the P, S, N, Al and Mg contents are controlled as follows:

$[P]_w + K \times [P]_f$: 0.015 weight percent or less,
$[S]_w + K \times [S]_f$: 0.010 weight percent or less,
$[N]_w + K \times [N]_f$: 0.015 weight percent or less,
$[Al]_w + K \times [Al]_f$: 0.30 weight percent or less, and
$[Mg]_w + K \times [Mg]_f$: 0.50 weight percent or less.

DETAILED DESCRIPTION OF THE PREFERRED EMBODIMENTS

Figure 1A:
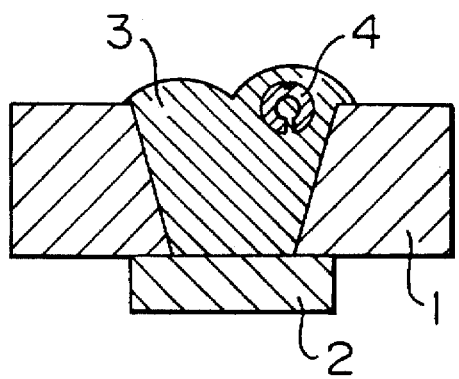
FIG. 1A is a schematic cross-sectional view illustrating the position and the direction for sampling a cylindrical test piece from a weld metal for a ring cracking test.

Cold cracking is generally caused by the diffusible hydrogen content, residual tensile stress, and hardened microstructure. Because the high-strength Cr—Mo steels intended for the present invention contains more kinds of alloy elements compared with conventional Cr—Mo steels, a harder microstructure is readily formed and thus the residual stress readily increases. In techniques corresponding to prior art welding materials, the probability of cold cracking will increase with troublesome welding procedure control for preventing cracking.

The present inventors found that when the water content in the entire welding electrode is controlled to 600 ppm by weight or less the diffusible hydrogen content causing cold cracking can be effectively reduced. Low-hydrogen-type welding electrodes have been used for low alloy steel including such steel and some standards of welding materials describe the water content.

For example, the water content of the covering material of the welding electrode is defined in AWS A5.5 of Standards of American Welding Society. The standards, however, define only the water content of the covering material, and do not define hydrogen sources such as hydrogen contained in the core wire and hydrogen remaining on the surface of the core wire, for example. Further, the standards cover welding materials other than the high-strength Cr—Mo steels intended for the present invention, and thus the values specified in the standards is not applicable to such Cr—Mo steels. Accordingly, the present invention directs hydrogen sources of the entire covered arc welding electrode and intends the prevention of cold cracking by controlling the hydrogen content suitable to the high-strength Cr—Mo steels.

In the high-strength Cr—Mo steels intended for the present invention, various high temperature characteristics are improved by adding an alloy mainly containing vanadium into prior art steel. When welding is carried out using such steels, the welding procedure must be definitely controlled in response to the components and the strength properties, compared with the prior art steel. The present invention enables the welding procedure control to simplify and a further excellent welding joint to obtain.

The present inventors further have investigated methods for preventing another problem, i.e., reheat cracking. Reheat cracking is formed by the effect of the residual stress to the position at which the grain boundary strength is relatively decreased due to the precipitation of carbide inside the grain in the weld metal. It is effective to prevent reheat cracking by decreasing the phosphorus (P) content precipitating in the grain boundaries of the weld metal and causing the decreased grain boundary strength. Thus, the strength of the grain boundaries is enhanced and the area of the grain boundaries is increased by fining the microstructure so that the stress applying to the unit area is dispersed. The present invention intends to increase the area of the brain boundary by controlling the basicity of the covering material and thus by precipitating a bainitic (partly ferrite) microstructure in the existing austenitic grain boundaries.

The grounds of the limitation of components and compositions contained in either or both of the core wire and the covering material will now be explained, wherein $[X]_w$ represents a content of chemical component X in the core wire by weight percent, $[Y]_f$ represents a content of chemical component Y in the covering material by weight percent, and K equals to $t/(1-t)$ wherein t is a covering rate which represents a weight ratio of the covering material to the welding electrode per unit length.

$[C]_w + K \times [C]_f$: 0.15 weight percent or less

Although carbon (C) is an essential to secure the strength of the weld metal, when $[C]_w + K \times [C]_f$ exceeds 0.15 weight percent, the strength excessively increases resulting in the decrease in toughness, cold cracking resistance and reheat cracking resistance. Thus, $[C]_w + K \times [C]_f$ is determined to be 0.15 weight percent or less, and preferably from 0.02 to 0.15 weight percent.

$[Si]_w + K \times [Si]_f$: 0.35 to 2.4 weight percent

When $[Si]_w + K \times [Si]_f$ is less than 0.35 weight percent, spherical defects readily form in the weld metal due to insufficient deoxidation. In addition, the wettability of the weld metal is decreased to readily form concave beads. On the other hand, when $[Si]_w + K \times [Si]_f$ exceeds 2.4 weight percent, the strength excessively increases resulting in the decrease in toughness. Thus, $[Si]_w + K \times [Si]_f$ is determined to be 0.35 to 2.4 weight percent.

$[Mn]_w + K \times [Mn]_f$: 0.5 to 2.0 weight percent

When $[Mn]_w + K \times [Mn]_f$ is less than 0.5 weight percent, its hardenability decreases and the microstructure in the weld metal is coarsened, resulting the decrease in toughness. On the other hand, when $[Mn]_w + K \times [Mn]_f$ exceeds 2.0 weight percent, the strength excessively increases resulting in the decrease in toughness. Thus, $[Mn]_w + K \times [Mn]_f$ is determined to be 0.5 to 2.0 weight percent.

$[Cr]_w + K \times [Cr]_f$: 2.0 to 4.0 weight percent

Chromium (Cr) is an essential component to improve thermal stability and oxidation resistance of the Cr—Mo steels used for high-temperature and high-pressure vessels in accordance with the present invention. Cr must be included in at least one of the core wire and the covering material in an amount equivalent to that in the standard for such Cr—Mo steels. Thus, $[Cr]_w + K \times [Cr]_f$ is contained at least 2.0 weight percent. On the other hand, when $[Cr]_w + K \times [Cr]_f$ exceeds 4.0 weight percent, the matching with the Cr—Mo steels matrix is deteriorated. Thus, $[Cr]_w + K \times [Cr]_f$ is determined to 2.0 to 4.0 weight percent.

$[Mo]_w + K \times [Mo]_f$: 0.01 to 1.5 weight percent

When $[Mo]_w + K \times [Mo]_f$ is less than 0.01 weight percent, the strength decreases at a high temperature. On the other hand, when $[Mo]_w + K \times [Mo]_f$ exceeds 1.5 weight percent, the strength increases and thus cold cracking readily occurs. Thus, $[Mo]_w + K \times [Mo]_f$ is determined to 0.01 to 1.5 weight percent.

$[V]_w + K \times [V]_f$: 0.15 to 0.60 weight percent

Vanadium (V) precipitates fine carbides in the weld metal to enhance the strength of the weld metal at a high temperature. When $[V]_w + K \times [V]_f$ is less than 0.15 weight percent, precipitation hardening is not sufficiently carried out. On the other hand, when $[V]_w + K \times [V]_f$ exceeds 0.60 weight percent, a large amount of carbide precipitates and thus readily occurs cold cracking. Thus, $[V]_w + K \times [V]_f$ is determined to be 0.15 to 0.60 weight percent.

Next, the grounds of limitation of the components and the composition added into either or both of the core wire and the covering material will be explained. The following components can be added so that at least one condition among conditions as described below is satisfied:

$[Ti]_w + [Zr]_w + [Hf]_w + K \times ([Ti]_f + 0.02 \times [TiO_2]_f + [Zr]_f + [Hf]_f)$: 0.005 to 0.500 weight percent Titanium (Ti), zirconium (Zr) and hafnium (Hf) belong to Group 4A of the periodic table and have similar effects. The oxides of such elements act as the nucleation sites to fine down the microstructure in the weld metal in the solidification process of the weld metal. When $[Ti]_w + [Zr]_w + [Hf]_w + K \times ([Ti]_f + 0.02 \times [TiO_2]_f + [Zr]_f + [Hf]_f)$ is less than 0.005 weight percent, the efficiency for fining the weld metal decreases due to the decreased nucleation sites. On the other hand, when $[Ti]_w + [Zr]_w + [Hf]_w + K \times ([Ti]_f + 0.02 \times [TiO_2]_f + [Zr]_f + [Hf]_f)$ exceeds 0.500 weight percent, reheat cracking readily occurs due to the increased strength. Thus, $[Ti]_w + [Zr]_w + [Hf]_w + K \times ([Ti]_f + 0.02 \times [TiO_2]_f + [Zr]_f + [Hf]_f)$ is determined to be 0.005 to 0.500 weight percent.

$[Nb]_w + [Ta]_w + K \times ([Nb]_f + [Ta]_f)$: 0.005 to 0.200 weight percent

Niobium (Nb) and Tantalum (Ta) belong to Group 5A of the periodic table and enhance the strength of the weld metal at a high temperature due to precipitation strengthen based on the carbide formation in the weld metal. When $[Nb]_w+[Ta]_w+K\times([Nb]_f+[Ta]_f)$ is less than 0.005 weight percent, carbide is not sufficiently formed, resulting in the decrease in such an effect. On the other hand, when $[Nb]_w+[Ta]_w+K\times([Nb]_f+[Ta]_f)$ exceeds 0.200 weight percent, reheat cracking readily occurs due to the excessive carbide precipitation. Thus, $[Nb]_w+[Ta]_w+K\times([Nb]_f+[Ta]_f)$ is determined to be 0.005 to 0.200 weight percent.

$[Ni]_w+K\times[Ni]_f$: 0.10 to 1.00 weight percent

Nickel (Ni) improves the toughness of the weld metal. When $[Ni]_w+K\times[Ni]_f$ is less than 0.10 weight percent, such an effect is deteriorated. On the other hand, when $[Ni]_w+K\times[Ni]_f$ exceeds 1.00 weight percent, the creep rupture strength decreases, and thus the used at a higher temperature is unsuitable. Thus, $[Ni]_w+K\times[Ni]_f$ is determined to be 0.10 to 1.00 weight percent.

$[Co]_w+K\times[Co]_f$: 0.10 to 1.00 weight percent or
$[W]_w+K\times[W]_f$: 0.10 to 2.50 weight percent Cobalt (Co) and tungsten (W) improve the high-temperature short-time strength and creep rupture strength of the weld metal. When $[Co]_w+K\times[Co]_f$ or $[W]_w+K\times[W]_f$ is less than 0.10 weight percent in the cobalt or tungsten addition, such strengths cannot be sufficiently increased. On the other hand, when $[Co]_w+K\times[Co]_f$ exceeds 1.00 weight percent or $[W]_w+K\times[W]_f$ exceeds 2.50 weight percent, cold cracking readily occurs in the weld metal. Thus, $[Co]_w+K\times[Co]_f$ is determined to be 0.10 to 1.00 weight percent when cobalt is added or $[W]_w+K\times[W]_f$ is determined to be 0.10 to 2.50 weight percent when tungsten is added.

$[B]_w+K\times([B]_f+0.12\times[B_2O_3]_f)$: 0.002 to 0.1 weight percent

Boron (B) improves the toughness of the weld metal. When $[B]_w+K\times([B]_f+0.12\times[B_2O_3]_f)$ is less than 0.002 weight percent, the improvement cannot be achieved. On the other hand, when $[B]_w+K\times([B]_f+0.12\times[B_2O_3]_f)$ exceeds 0.1 weight percent, reheat cracking occurs. Thus, $[B]_w+K\times([B]_f+0.12\times[B_2O_3]_f)$ is determined to be 0.002 to 0.1 weight percent. Since $B_2O_3$ in the covering material remains by the reduction as B (single substance) in the weld metal, $B_2O_3$ is multiplied by the factor 0.12 in consideration of such reduction.

Next, the grounds of limitation of the compositions of impurities included in either or both of the core wire and the covering material.

$[P]_w+K\times[P]_f$: 0.015 weight percent or less

When $[P]_w+K\times[P]_f$ exceeds 0.015 weight percent, phosphorus (P) precipitates at the grain boundaries in the weld metal to decrease the strength, and thus temper-embrittlement and reheat cracking readily occur. Thus, $[P]_w+K\times[P]_f$ is limited to be 0.015 weight percent or less.

$[S]_w+K\times[S]_f$: 0.010 weight percent or less

When $[S]_w+K\times[S]_f$ exceeds 0.010 weight percent, hot cracking is caused and toughness is decreased. Thus, $[S]_w+K\times[S]_f$ is limited to be 0.010 weight percent or less.

$[N]_w+K\times[N]_f$: 0.015 weight percent or less

Nitrogen (N) is an element decreasing the toughness of the weld metal. When nitrogen is excessively included in the weld metal, it cannot be completely dissolved and thus will form spherical defects. Further, it causes the decrease in creep rupture strength of high-strength Cr—Mo steels. When $[N]_w+K\times[N]_f$ exceeds 0.015 weight percent, these effects are pronouncedly revealed. Thus, $[N]_w+K\times[N]_f$ is limited to be 0.015 weight percent or less.

$[Al]_w+K\times[Al]_f$: 0.30 weight percent or less, and
$[Mg]_w+K\times[Mg]_f$: 0.50 weight percent or less Although aluminum (Al) and magnesium (Mg) act as strong deoxidizing agents, they significantly decrease welding workability if they are included in the weld metal. Thus, $[Al]_w+K\times[Al]_f$ is limited to be 0.30 weight percent or less, and $[Mg]_w+K\times[Mg]_f$ is limited to be 0.50 weight percent or less.

Incidental impurities in the present invention include As, Sb, Sn and the like, as well as the above-mentioned elements. It is preferred that these incidental impurities are limited as follows: 0.010 weight percent or less for $[As]_w+K\times[As]_f$, 0.010 weight percent or less for $[Sb]_w+K\times[Sb]_f$, and 0.010 weight percent or less for $[Sn]_w+K\times[Sn]_f$.

Water Content in the Entire Welding Electrode: 50 to 600 ppm by Weight

Cold cracking of the weld metal can be prevented by decreasing the water content in the weld metal, as set forth above. When the water content in the entire welding electrode exceeds 600 ppm by weight, cold cracking of the weld metal readily occurs. On the other hand, when the water content in the entire welding electrode is less than 50 ppm by weight, it is impractical due to the decreased welding workability. Thus, the water content in the entire welding electrode is determined to be 50 to 600 ppm by weight. The hydrogen sources in the covered arc welding electrode also include residual materials adhering to the surface of the core wire and residual hydrogen in the core wire, in addition to water in the covering material and crystal water included in the raw materials for the covering material. Thus, the water content in the entire welding electrode represents the total amounts of water including all hydrogen sources converted into water.

Basicity BL: 2.0 to 8.0

As set forth above, reheat cracking of the weld metal can be prevented by appropriately controlling the basicity BL represented by the equation (1) set forth below. When the basicity BL exceeds 8.0, reheat cracking cannot be effectively prevented. On the other hand, when the basicity is less than 2.0, the toughness of the weld metal decreases. Thus the basicity is determined to be from 2.0 to 8.0. Because the oxygen content in the weld metal is 200 to 500 ppm by weight in such a case, the toughness of the weld metal is excellent and reheat cracking can be prevented. In the equation (1) set forth below, carbonates are converted to their respective oxides, for example, $CaCO_3$ is converted to CaO, and $BaCO_3$ is converted to BaO.

$$BL = ([CaO]_f + [MgO]_f + [BaO]_f + [CaF_2]_f + [Na_2O]_f + [K_2O]_f + 0.5 \times ([FeO]_f + [MnO]_f))/([SiO_2]_f + 0.5 \times ([Al_2O_3]_f + [TiO_2]_f + [ZrO_2]_f)) \quad (1)$$

Further, the flux can contain fluorides, e.g. $BaF_2$ and NaF, carbonates, e.g. $SrCO_3$ and $Li_2CO_3$, other slag forming agents and arc stabilizers, for example, other than compounds used in the calculation of the basicity.

EXAMPLES

The low-hydrogen-type covered arc welding electrode for high-strength Cr—Mo steels in accordance with the present invention will now be illustrated in reference to Examples as well as Comparative Examples.

Covered arc welding electrodes each having a core wire diameter of 4.0 mm were prepared by combining core wires having chemical compositions (the balance is iron and incidental impurities) exhibited in Tables 1 and 2 set forth below with covering materials having chemical compositions exhibited in Tables 3 to 7 set forth below. The contents of the chemical components of the core wires and covering materials exhibited in Tables 1 to 7 were applied to equations used to specify the chemical compositions in accordance with the present invention. Electrodes, in which all the values are within the present invention, were set to Examples, and those, in which at least one value is without the present invention, were set to Comparative Examples. Steel sheets were welded by using these samples. Calculated contents of the components will be shown in Tables 8 to 13 set forth below. The calculated content of component X represents $[X]_w+K\times[X]_f$ in these tables, but $[Ti]_w+K\times([Ti]_f+0.02\times[TiO_2]_f)$ for titanium (Ti) and $[B]_w+K\times([B]_f+0.12\times[B_2O_3]_f)$ for boron (B). As a welding test plate, 50-mm thick JIS G 4110 SCMQ4V steel sheets were welded under the welding conditions based on JIS Z 3223 (Molybdenum steel and chromium-molybdenum steel covered electrodes).

The resulting weld metals were subjected to various mechanical tests, cold cracking and reheat cracking tests, and welding workability evaluation. As mechanical tests, all-welded tensile test and Charpy impact test were carried out based on JIS Z 3111 (Methods of Tension and Impact Tests for Deposited Metal). Test pieces after PWHT at 690° C. for 10 hours were used for the all-welded tensile test, and test pieces after the PWHT followed by a step-cooling heat treatment were used for the impact test. Cold cracking test was carried out based on JIS Z 3157 (Method of U-Groove Weld Cracking Test) under the conditions of a preheat temperature of 250° C., 80% relative humidity atmosphere at 30° C., and a speed ratio (of electrode) of 0.8. Reheat cracking was evaluated by a ring cracking test in reference to 'Study on Stress Relief Cracking in Heat Affected Zone (Report 2)' (Naiki et al., Journal of the Japan Welding Society, vol. 33, No. 9 (1964), page 718).

The sampling method, shape and test method of a cylindrical test piece for the ring cracking test will now be explained.

Figure 1B:
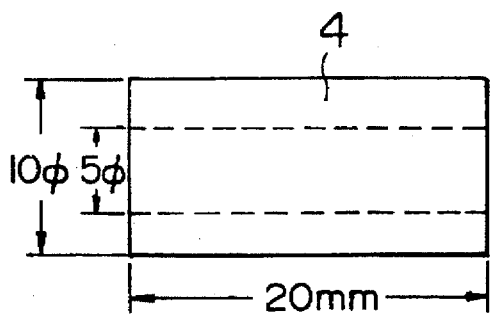
FIGS. 1B and 1C are side and cross-sectional views illustrating the shape of the cylindrical test piece.
Figure 1C:
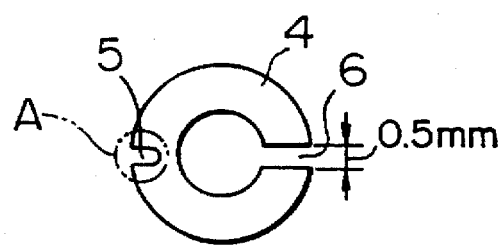
Figure 1D:
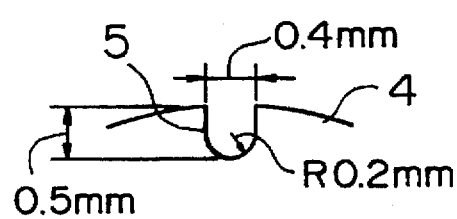
FIG. 1D is an enlarged cross-sectional view illustrating the notch section of the cross-sectional view.
Figure 1E:
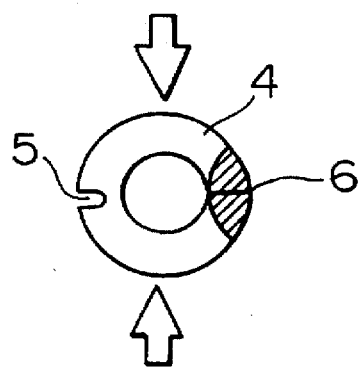
FIG. 1E is a schematic cross-sectional view illustrating the ring cracking test method using the cylindrical test piece.

FIG. 1A is a schematic cross-sectional view illustrating the position and the direction for sampling a cylindrical test piece from a weld metal for the ring cracking test, FIGS. 1B and 1C are side and cross-sectional views illustrating the shape of the cylindrical test piece, FIG. 1D is an enlarged cross-sectional view illustrating the notch section of the cross-sectional view, and FIG. 1E is a schematic cross-sectional view illustrating the ring cracking test method using the cylindrical test piece.

A cylindrical test piece 4 having a notch and a slit was sampled from the upper portion of the final bead of the weld metal 3 formed at the groove face of the welding test plate 1 and a backing strip 2, as shown in FIG. 1A, wherein the sampling was carried out so that the notch 5 is located at the upper section of the un-heat-affected zone in the weld metal 3 and the slit 6 is located at the lower section, as shown in FIG. 1C. The resulting cylindrical test piece 4 has a longitudinal length of 20 mm, an outer diameter of 10 mm and an inner diameter of 5 mm, as shown in FIG. 1B. Further, the cylindrical test piece 4 has a 0.5-mm wide slit toward the inside cavity along the longitudinal direction, and has a notch 5 at the outer surface opposite to the slit along the longitudinal direction, as shown in FIG. 1C.

The notch 5 has a depth of 0.5 mm, a width of 0.4 mm, and a U-shaped groove having a radius of curvature of 0.2 mm at the bottom, as shown in FIG. 1D which is an enlarged view of notch section A in FIG. 1C. Such a test piece was used for the ring cracking test.

The ring cracking test was carried out according to the method shown in FIG. 1E: Bending stresses were applied to the cylindrical test piece 4 along arrows; the slit 6 of the test piece 4 was subjected to TIG arc welding without filler metal; the test piece was heated at 625° C. for 10 hours while remaining tensile stress at the bottom of the U-shaped groove; and ring cracking was evaluated by cracks formed at the bottom of the notch 5. Results will be shown in Tables 14 and 15 set forth below. The water content in Tables 14 and 15 represents the value measured after drying the sample at 350° C. for 1 hour. Regarding evaluation standards of mechanical tests, a creep rupture strength of 200 N/mm² or more at 550° C. for 1,000 hours and a Charpy impact test value of 100 J or more were set to "pass inspection". Regarding cold cracking and reheat cracking, no cracking was evaluated as "Good" and cracking was evaluated as "No good".

TABLE 1

| Core Wire | Composition of Core Wire (Weight %) | | | | | | | | | |
|---|---|---|---|---|---|---|---|---|---|---|
| No. | C | Si | Mn | P | S | Ni | Cr | Mo | V | Al |
| W-1 | 0.08 | 0.13 | 0.48 | 0.005 | 0.004 | 0.01 | 0.02 | 0.02 | 0.01 | — |
| W-2 | 0.05 | 0.15 | 0.43 | 0.007 | 0.002 | 0.05 | 2.34 | 0.95 | 0.02 | — |
| W-3 | 0.01 | 0.21 | 0.65 | 0.002 | 0.001 | 0.01 | 2.16 | 0.01 | 0.27 | — |
| W-4 | 0.07 | 0.05 | 0.55 | 0.004 | 0.003 | — | 2.50 | 0.05 | 0.35 | — |
| W-5 | 0.10 | 0.31 | 0.27 | 0.001 | 0.001 | — | 3.57 | 0.50 | — | — |
| W-6 | 0.02 | 0.02 | 0.02 | 0.003 | 0.002 | — | 2.24 | 0.37 | 0.22 | — |
| W-7 | 0.06 | 0.15 | 0.47 | 0.002 | 0.001 | — | — | — | 0.20 | — |
| W-8 | 0.15 | 0.22 | 0.52 | 0.013 | 0.004 | 0.65 | 2.48 | 0.92 | — | — |
| W-9 | 0.03 | 0.45 | 0.02 | 0.008 | 0.013 | 0.50 | — | — | — | — |
| W-10 | 0.04 | 0.02 | 0.53 | 0.005 | 0.002 | 0.26 | 2.66 | — | 0.23 | — |
| W-11 | 0.06 | 0.18 | 0.52 | 0.006 | 0.003 | — | 2.27 | 1.01 | 0.28 | — |
| W-12 | 0.07 | 0.13 | 0.25 | 0.002 | 0.003 | 0.03 | 0.04 | 0.03 | 0.02 | 0.12 |

TABLE 2

| Core Wire No. | Composition of Core Wire (Weight %) | | | | | | | | | |
|---|---|---|---|---|---|---|---|---|---|---|
| | Nb | N | Ti | Zr | Hf | Ta | Co | W | B | Mg |
| W-1 | 0.003 | 0.007 | — | — | — | — | — | — | — | — |
| W-2 | 0.005 | 0.009 | — | — | — | — | — | — | — | — |
| W-3 | 0.024 | 0.005 | — | — | — | — | — | — | — | — |
| W-4 | — | 0.004 | — | — | — | 0.183 | — | 1.87 | — | — |
| W-5 | — | 0.003 | — | — | 0.034 | — | — | — | — | — |
| W-6 | — | 0.002 | — | — | — | — | 0.22 | — | 0.052 | — |
| W-7 | — | 0.006 | — | 0.37 | — | — | — | — | — | — |
| W-8 | — | 0.008 | — | — | — | — | — | — | — | — |
| W-9 | — | 0.006 | 0.63 | — | — | — | — | — | — | — |
| W-10 | — | 0.006 | — | — | — | — | — | — | — | — |
| W-11 | — | 0.018 | — | — | — | — | — | — | — | — |
| W-12 | — | 0.006 | — | — | — | — | — | — | — | — |

TABLE 3

| Covering Material No. | Composition of Covering Material (Weight %) | | | | | | | | | |
|---|---|---|---|---|---|---|---|---|---|---|
| | $CaCO_3$ | MgO | $BaCO_3$ | $CaF_2$ | $Na_2O$ | $K_2O$ | FeO | MnO | $SiO_2$ | $TiO_2$ |
| F-1 | 37 | 2 | 5 | 18 | 2 | 3 | — | — | 10 | 2 |
| F-2 | 43 | 1 | 5 | 23 | 1 | 2 | — | — | 7 | — |
| F-3 | 34 | 1 | 3 | 15 | 1 | 2 | 1 | — | 8 | — |
| F-4 | 34 | 1 | 3 | 15 | 1 | 2 | 1 | — | 8 | — |
| F-5 | 37 | 2 | 5 | 18 | 2 | 3 | — | — | 10 | — |
| F-6 | 45 | 2 | 5 | 15 | 1 | 2 | 1 | — | 5 | 5 |
| F-7 | 37 | 2 | 5 | 18 | 2 | 3 | — | — | 10 | — |
| F-8 | 45 | 2 | 5 | 15 | 1 | 2 | 1 | — | 5 | 5 |
| F-9 | 37 | 2 | 5 | 18 | 2 | 3 | — | — | 10 | — |
| F-10 | 45 | 2 | 5 | 15 | 1 | 2 | 1 | — | 5 | 5 |
| F-11 | 45 | 2 | 5 | 15 | 1 | 2 | 1 | — | 5 | 5 |
| F-12 | 34 | 1 | 3 | 15 | 1 | 2 | 1 | — | 8 | — |
| F-13 | 40 | 5 | 5 | 20 | 2 | 3 | — | 2 | 3 | 2 |
| F-14 | 34 | 1 | 3 | 10 | 1 | 2 | 1 | — | 15 | 10 |

TABLE 4

| Covering Material No. | Composition of Covering Material (Weight %) | | | | | | | | |
|---|---|---|---|---|---|---|---|---|---|
| | $Al_2O_3$ | $ZrO_2$ | $B_2O_3$ | $BaF_2$ | $SrCO_3$ | C | Si | Mn | P |
| F-1 | 1 | 2 | — | 1 | — | 0.02 | 3.53 | 1.67 | 0.005 |
| F-2 | 1 | 1 | — | 2 | 4 | 0.01 | 3.40 | 0.89 | 0.006 |
| F-3 | — | 4 | — | — | — | 0.06 | 1.83 | 3.27 | 0.009 |
| F-4 | — | 4 | — | 1 | 2 | 0.18 | 0.69 | 4.17 | — |
| F-5 | 1 | 2 | 0.14 | — | — | 0.12 | 5.20 | 2.72 | 0.012 |
| F-6 | 2 | 2 | — | — | 3 | 0.12 | 1.35 | 1.84 | 0.007 |
| F-7 | 1 | 2 | — | 2 | 4 | 0.15 | 3.09 | 1.25 | — |
| F-8 | 2 | 2 | — | — | — | 0.07 | 2.28 | 1.74 | 0.007 |
| F-9 | 1 | 2 | — | — | — | 0.15 | 3.09 | 1.25 | — |
| F-10 | 2 | 2 | — | — | — | 0.07 | 3.46 | 2.33 | 0.002 |
| F-11 | 2 | 2 | 2.50 | — | — | 0.12 | 1.91 | 2.21 | 0.005 |
| F-12 | — | 4 | — | 3 | 7 | 0.04 | 2.27 | 0.89 | 0.006 |
| F-13 | 1 | 2 | — | — | 2 | 0.04 | 2.27 | 0.89 | 0.006 |
| F-14 | 5 | 8 | — | — | — | 0.04 | 2.27 | 0.89 | 0.006 |

TABLE 5

| Covering Material No. | Composition of Covering Material (Weight %) | |
|---|---|---|
| | S | Ni |
| F-1 | 0.002 | — |
| F-2 | 0.012 | — |
| F-3 | 0.012 | 0.09 |
| F-4 | — | 2.58 |
| F-5 | 0.015 | 0.25 |
| F-6 | 0.002 | — |
| F-7 | 0.002 | 1.25 |
| F-8 | 0.005 | — |
| F-9 | 0.002 | 1.25 |
| F-10 | 0.005 | — |
| F-11 | 0.007 | 1.74 |
| F-12 | 0.012 | — |
| F-13 | 0.012 | — |
| F-14 | 0.012 | — |

TABLE 6

| Covering Material No. | Composition of Covering Material (Weight %) | | | | | | | |
|---|---|---|---|---|---|---|---|---|
| | Cr | Mo | V | Nb | N | Al | Mg | Ti |
| F-1 | 6.13 | 2.45 | 0.76 | 0.005 | 0.005 | 0.007 | 0.26 | 0.002 |
| F-2 | 0.71 | 0.04 | 0.83 | 0.110 | — | 0.36 | 0.27 | — |
| F-3 | 0.54 | 0.60 | 0.42 | 0.030 | 0.006 | 0.015 | 0.78 | — |
| F-4 | 10.62 | 4.08 | 1.68 | 0.030 | — | 0.615 | 0.24 | 0.005 |
| F-5 | 1.05 | — | 0.37 | — | 0.012 | — | 0.44 | — |
| F-6 | 2.89 | 2.33 | — | — | 0.002 | — | — | — |
| F-7 | — | — | 1.05 | — | — | — | — | — |
| F-8 | 0.59 | 2.65 | — | 0.172 | 0.007 | — | — | — |
| F-9 | 4.75 | 1.33 | 1.05 | — | — | — | — | — |
| F-10 | 0.71 | 1.86 | 0.47 | 0.047 | 0.010 | — | 0.54 | — |
| F-11 | — | 0.17 | 0.81 | 0.051 | 0.012 | — | — | — |
| F-12 | 1.83 | 0.04 | 0.41 | 0.026 | 0.006 | 0.22 | 1.40 | 0.004 |
| F-13 | 1.83 | 0.04 | 0.41 | 0.026 | 0.006 | 0.22 | 0.73 | 0.004 |
| F-14 | 1.83 | 0.04 | 0.41 | 0.026 | 0.006 | 0.22 | 0.73 | 0.004 |

TABLE 7

| Covering Material No. | Composition of Covering Material (Weight %) | | | | | | Basicity BL |
|---|---|---|---|---|---|---|---|
| | Zr | Hf | Ta | Co | W | Others | |
| F-1 | — | — | — | — | — | 2.15 | 3.97 |
| F-2 | — | — | — | — | — | 3.38 | 6.87 |
| F-3 | — | — | — | — | — | 24.26 | 4.09 |
| F-4 | 0.042 | — | 0.039 | — | — | 3.11 | 4.09 |
| F-5 | — | — | — | — | — | 9.67 | 4.31 |
| F-6 | — | — | — | — | — | 3.46 | 5.69 |
| F-7 | — | 0.343 | — | — | 1.59 | 4.28 | 4.31 |
| F-8 | — | — | — | — | 1.87 | 5.61 | 5.69 |
| F-9 | — | 0.343 | — | — | — | 6.79 | 4.31 |
| F-10 | — | — | — | 2.99 | — | 2.51 | 5.69 |
| F-11 | — | — | — | — | — | 5.47 | 5.69 |
| F-12 | — | — | — | — | — | 13.85 | 4.09 |
| F-13 | — | — | — | — | — | 6.52 | 10.42 |
| F-14 | — | — | — | — | — | 3.52 | 1.35 |

TABLE 8

| No. | Core Wire No. | Covering Material No. | Covering Rate t (%) | Calculated Contents (Weight %) | | | | | |
|---|---|---|---|---|---|---|---|---|---|
| | | | | C | Si | Mn | P | S | Ni |
| Examples | | | | | | | | | |
| 1 | W-1 | F-1 | 29 | 0.09 | 1.54 | 1.16 | 0.007 | 0.005 | 0.01 |
| 2 | W-2 | F-2 | 33 | 0.07 | 1.82 | 0.87 | 0.010 | 0.008 | 0.05 |
| 3 | W-3 | F-3 | 25 | 0.03 | 0.82 | 1.74 | 0.005 | 0.005 | 0.04 |
| 4 | W-1 | F-4 | 25 | 0.14 | 0.36 | 1.87 | 0.005 | 0.004 | 0.87 |
| 5 | W-2 | F-5 | 29 | 0.10 | 2.27 | 1.54 | 0.012 | 0.007 | 0.15 |
| 6 | W-4 | F-6 | 30 | 0.12 | 0.63 | 1.34 | 0.007 | 0.004 | — |
| 7 | W-5 | F-3 | 33 | 0.13 | 1.21 | 1.88 | 0.005 | 0.007 | 0.04 |
| 8 | W-6 | F-5 | 29 | 0.07 | 2.14 | 1.13 | 0.008 | 0.008 | 0.10 |
| 9 | W-2 | F-7 | 29 | 0.08 | 1.41 | 0.93 | 0.007 | 0.003 | 0.56 |
| 10 | W-7 | F-1 | 33 | 0.07 | 1.89 | 1.29 | 0.004 | 0.002 | — |

TABLE 9

| | Calculated Contents (Weight %) | | | | | | | |
|---|---|---|---|---|---|---|---|---|
| No. | Cr | Mo | V | Nb | N | Al | Mg | Ti |
| Examples | | | | | | | | |
| 1 | 2.51 | 1.02 | 0.32 | 0.005 | 0.009 | 0.003 | 0.11 | 0.016 |
| 2 | 3.69 | 0.97 | 0.42 | 0.059 | 0.009 | 0.18 | 0.13 | — |
| 3 | 2.34 | 0.21 | 0.41 | 0.034 | 0.007 | 0.005 | 0.26 | — |
| 4 | 3.56 | 1.38 | 0.57 | 0.013 | 0.007 | 0.21 | 0.08 | 0.002 |
| 5 | 2.77 | 0.95 | 0.17 | 0.005 | 0.014 | — | 0.18 | — |
| 6 | 3.74 | 1.05 | 0.35 | — | 0.005 | — | — | — |
| 7 | 3.84 | 0.80 | 0.21 | 0.015 | 0.006 | 0.007 | 0.38 | — |
| 8 | 2.67 | 0.37 | 0.37 | — | 0.007 | — | 0.18 | — |
| 9 | 2.34 | 0.95 | 0.45 | 0.005 | 0.009 | — | — | — |
| 10 | 3.02 | 1.20 | 0.57 | 0.002 | 0.008 | — | 0.13 | — |

TABLE 10

| | | Calculated Contents (Weight %) | | | | |
|---|---|---|---|---|---|---|
| No. | Zr | Hf | Ta | Co | W | B |
| Examples | | | | | | |
| 1 | — | — | — | — | — | — |
| 2 | — | — | — | — | — | — |
| 3 | — | — | — | — | — | — |
| 4 | 0.014 | — | 0.013 | — | — | — |
| 5 | — | — | — | — | — | 0.007 |
| 6 | — | — | 0.183 | — | 1.87 | — |
| 7 | — | 0.034 | — | — | — | — |
| 8 | — | — | — | 0.22 | — | 0.052 |
| 9 | — | 0.14 | — | — | 0.65 | — |
| 10 | 0.37 | — | — | — | — | — |

TABLE 11

| | No. | Core Wire No. | Covering Material No. | Covering Rate t(%) | Calculated Contents (Weight %) | | | | | |
|---|---|---|---|---|---|---|---|---|---|---|
| | | | | | C | Si | Mn | P | S | Ni |
| Comparative Examples | 11 | W-2 | F-6 | 29 | 0.10 | 0.70 | 1.18 | 0.010 | 0.002 | 0.01 |
| | 12 | W-5 | F-1 | 25 | 0.11 | 1.49 | 0.83 | 0.003 | 0.002 | — |
| | 13 | W-8 | F-3 | 29 | 0.17 | 0.97 | 1.85 | 0.017 | 0.009 | 0.67 |
| | 14 | W-3 | F-5 | 35 | 0.07 | 3.11 | 2.11 | 0.008 | 0.009 | 0.14 |
| | 15 | W-1 | F-4 | 22 | 0.13 | 0.32 | 1.66 | 0.005 | 0.004 | 0.74 |
| | 16 | W-6 | F-2 | 29 | 0.02 | 1.41 | 0.38 | 0.005 | 0.007 | — |
| | 17 | W-9 | F-4 | 25 | 0.09 | 0.73 | 1.41 | 0.008 | 0.013 | 1.36 |
| | 18 | W-7 | F-6 | 35 | 0.12 | 0.88 | 1.46 | 0.006 | 0.002 | — |
| | 19 | W-10 | F-5 | 29 | 0.09 | 2.14 | 1.64 | 0.010 | 0.008 | 0.36 |
| | 20 | W-7 | F-4 | 25 | 0.12 | 0.38 | 1.86 | 0.002 | 0.001 | 0.86 |
| | 21 | W-4 | F-8 | 29 | 0.10 | 0.98 | 1.26 | 0.007 | 0.005 | — |
| | 22 | W-7 | F-9 | 33 | 0.13 | 1.57 | 1.09 | 0.002 | 0.002 | 0.62 |
| | 23 | W-6 | F-10 | 29 | 0.05 | 1.43 | 0.97 | 0.004 | 0.005 | — |
| | 24 | W-2 | F-11 | 29 | 0.10 | 1.88 | 1.33 | 0.009 | 0.005 | 0.76 |
| | 25 | W-11 | F-3 | 29 | 0.98 | 0.93 | 1.85 | 0.010 | 0.008 | 0.04 |
| | 26 | W-12 | F-4 | 25 | 0.13 | 0.36 | 1.64 | 0.002 | 0.003 | 0.89 |
| | 27 | W-2 | F-12 | 33 | 0.06 | 1.27 | 0.89 | 0.010 | 0.008 | 0.05 |
| | 28 | W-2 | F-13 | 33 | 0.07 | 1.27 | 0.87 | 0.010 | 0.008 | 0.05 |
| | 29 | W-2 | F-14 | 33 | 0.07 | 1.27 | 0.87 | 0.010 | 0.008 | 0.05 |

TABLE 12

| | No. | Calculated Contents (weight %) | | | | | | | |
|---|---|---|---|---|---|---|---|---|---|
| | | Cr | Mo | V | Nb | N | Al | Mg | Ti |
| Comparative Examples | 11 | 3.52 | 1.90 | 0.27 | 0.024 | 0.006 | — | — | — |
| | 12 | 5.61 | 1.32 | 0.25 | 0.002 | 0.005 | 0.002 | 0.09 | 0.001 |
| | 13 | 2.70 | 1.16 | 0.17 | 0.012 | 0.010 | 0.006 | 0.32 | — |
| | 14 | 2.72 | 0.01 | 0.47 | 0.024 | 0.011 | — | 0.24 | — |
| | 15 | 3.01 | 1.17 | 0.48 | 0.011 | 0.007 | 0.173 | 0.07 | 0.001 |
| | 16 | 2.53 | 0.39 | 0.56 | 0.045 | 0.002 | 0.147 | 0.11 | — |
| | 17 | 3.54 | 1.36 | 0.56 | 0.010 | 0.006 | 0.205 | 0.08 | 0.632 |
| | 18 | 1.55 | 1.25 | 0.11 | — | 0.007 | — | — | — |
| | 19 | 3.08 | — | 0.38 | — | 0.011 | — | 0.18 | — |
| | 20 | 3.54 | 1.36 | 0.76 | 0.010 | 0.006 | 0.205 | 0.08 | 0.002 |
| | 21 | 2.74 | 1.13 | 0.35 | 0.070 | 0.007 | — | — | — |
| | 22 | 2.34 | 0.66 | 0.52 | — | 0.006 | — | — | |
| | 23 | 2.53 | 1.13 | 0.41 | 0.019 | 0.006 | — | 0.22 | — |
| | 24 | 2.34 | 1.02 | 0.35 | 0.026 | 0.014 | — | — | — |
| | 25 | 2.49 | 1.25 | 0.45 | 0.012 | 0.020 | 0.006 | 0.32 | — |
| | 26 | 3.58 | 1.39 | 0.58 | 0.010 | 0.006 | 0.325 | 0.08 | 0.002 |
| | 27 | 3.24 | 0.97 | 0.22 | 0.018 | 0.012 | 0.108 | 0.69 | 0.002 |
| | 28 | 3.24 | 0.97 | 0.22 | 0.018 | 0.012 | 0.11 | 0.36 | 0.002 |
| | 29 | 3.24 | 0.97 | 0.22 | 0.018 | 0.012 | 0.11 | 0.36 | 0.002 |

TABLE 13

| | No. | Calculated Contents (Weight %) | | | | | |
|---|---|---|---|---|---|---|---|
| | | Zr | Hf | Ta | Co | W | B |
| Comparative Examples | 11 | — | — | — | — | — | — |
| | 12 | — | — | — | — | — | — |
| | 13 | — | — | — | — | — | — |
| | 14 | — | — | — | — | — | — |
| | 15 | 0.012 | — | 0.011 | — | — | — |
| | 16 | — | — | — | 0.22 | — | 0.052 |
| | 17 | — | — | — | — | — | — |
| | 18 | 0.37 | — | — | — | — | — |
| | 19 | — | — | — | — | — | — |
| | 20 | 0.014 | — | 0.013 | — | — | — |
| | 21 | — | — | 0.183 | — | 2.63 | — |
| | 22 | 0.370 | 0.169 | — | — | — | — |
| | 23 | — | — | — | 1.22 | — | — |
| | 24 | — | — | — | — | — | 0.122 |
| | 25 | — | — | — | — | — | — |
| | 26 | 0.014 | — | 0.012 | — | — | — |
| | 27 | — | — | — | — | — | — |
| | 28 | — | — | — | — | — | — |
| | 29 | — | — | — | — | — | — |

TABLE 14

| | No. | 550° C. × 1000 hrs Creep Strength N/mm$^2$ | Impact Value (−20° C.) J | Cold Cracking | Reheat Cracking | Water Content ppm by wt | Welding Workability |
|---|---|---|---|---|---|---|---|
| Example | 1 | 256 | 135 | Good | Good | 408 | Good |
| | 2 | 278 | 120 | Good | Good | 398 | Good |
| | 3 | 219 | 168 | Good | Good | 350 | Good |
| | 4 | 288 | 137 | Good | Good | 512 | Good |
| | 5 | 227 | 195 | Good | Good | 168 | Good |
| | 6 | 312 | 179 | Good | Good | 248 | Good |
| | 7 | 246 | 147 | Good | Good | 418 | Good |
| | 8 | 276 | 156 | Good | Good | 338 | Good |
| | 9 | 277 | 144 | Good | Good | 489 | Good |
| | 10 | 269 | 128 | Good | Good | 245 | Good |

TABLE 15

| | No. | 550° C. × 1000 hrs Creep Strength N/mm$^2$ | Impact Value (−20° C.) J | Cold Cracking | Reheat Cracking | Water Content ppm by wt | Welding Workability |
|---|---|---|---|---|---|---|---|
| Comparative Example | 11 | 215 | 43 | No Good | Good | 469 | Good |
| | 12 | 169 | 35 | No Good | Good | 536 | Good |
| | 13 | 179 | 15 | No Good | No Good | 335 | Good |
| | 14 | 204 | 23 | Good | Good | 346 | Good |
| | 15 | — | — | — | — | 450 | No good |
| | 16 | 231 | 21 | Good | Good | 387 | Slightly no good |
| | 17 | 127 | 49 | Good | Good | 379 | Good |
| | 18 | 156 | 69 | Good | Good | 524 | Good |
| | 19 | 145 | 111 | Good | Good | 279 | Good |
| | 20 | 183 | 21 | No Good | Good | 460 | Good |
| | 21 | 143 | 14 | No Good | No Good | 298 | Good |

TABLE 15-continued

| No. | 550° C. × 1000 hrs Creep Strength N/mm² | Impact Value (−20° C.) J | Cold Cracking | Reheat Cracking | Water Content ppm by wt | Welding Workability |
|---|---|---|---|---|---|---|
| 22 | 242 | 33 | Good | No Good | 197 | Good |
| 23 | 220 | 41 | No Good | Good | 463 | Good |
| 24 | 152 | 54 | Good | No Good | 297 | Good |
| 25 | — | — | — | — | 338 | Spherical Defects |
| 26 | — | — | — | — | 428 | No good |
| 27 | — | — | — | — | 288 | No good |
| 28 | 265 | 133 | Good | No Good | 321 | Good |
| 29 | 273 | 62 | Good | Good | 414 | Good |
| 30 | — | — | — | — | 38 | No good |
| 31 | 262 | 118 | No Good | Good | 715 | Good |

Tables 8 to 15 demonstrate that Examples 1 to 10 having calculated contents within the range of the present invention exhibit excellent results of mechanical tests, cracking tests, and the welding workability.

In contrast, in Comparative Examples 11 and 12, cold cracking was found with the decrease in the impact value since the Mo or Cr content exceeds the upper limit of the range of the present invention. In Comparative Example 13, cold cracking of the weld metal as well as reheat cracking was found since the P content exceeds the upper limit of the range of the present invention. In Comparative Example 14, the strength excessively increased so as to decrease the impact value since the Si and Mn contents exceed the upper limit of the range of the present invention. In Comparative Example 15, workability was unsatisfactory since the Si content is less than the lower limit of the range of the present invention.

In Comparative Example 16, since the Mn content is less than the lower limit of the range of the present invention, the toughness decreased with less workability due to insufficient deoxidization. In Comparative Example 17, since the S content exceeds the upper limit of the range of the present invention, the impact value decreased, and since the Ni content exceeds the upper limit of the range of the present invention, the creep strength significantly decreased. In Comparative Example 18, since the Cr and V contents are less than the lower limit of the range of the present invention and the Cr content is low, the matching with the welding test plate was lost, and the creep strength decreased due to a low V content.

In Comparative Example 19, since the Mo content is less than the lower limit of the range of the present invention, the creep strength was not sufficient. In Comparative Example 20, since the V content exceeds the upper limit of the range of the present invention, the impact value significantly decreased as well as cold cracking formation. In Comparative Example 21, since the total content of Nb and Ta and the W content exceed the upper limits of the range of the present invention, cold cracking and reheat cracking were found. Further, the strength was extremely high to cause the significant decrease in toughness. In Comparative Example 22, the total content of Zr and Hf exceeds the upper limit of the range of the present invention, reheat cracking was found.

Since the Co content exceeds the upper limit of the range of the present invention in Comparative Example 23, the strength increased to cause cold cracking. Since the B content exceeds the upper limit of the range of the present invention in Comparative Example 24, reheat cracking was found. Since the N content exceeds the upper limit of the range of the present invention in Comparative Example 25, spherical defects occurred in the weld metal. Since the Al or Mg content exceeds the upper limit of the range of the present invention in Comparative Examples 26 and 27, the workability significantly decreased. Since the basicity BL exceeds the upper limit of the range of the present invention in Comparative Example 28, reheat cracking was found. Since the basicity BL is less than the lower limit of the range of the present invention in Comparative Example 29, the impact value decreased.

In Comparative Examples 30 and 31, the core wire and the covering material identical to Example 1 were used, but the water content was adjusted by changing the surface state of the core wire and the drying conditions of the welding electrode. In Comparative Example 30, since the water content in the entire welding electrode is less than the lower limit of the range of the present invention, the workability decreased. In Comparative Example 31, since the water content in the entire welding electrode exceeds the upper limit of the range of the present invention, cold cracking was found.

Mechanical tests and cracking test were not carried out for Comparative Examples 15, 25 to 27 and 30 in which workability was unsatisfactory or spherical defects occurred.

As set forth above, in accordance with the present invention, the contents of the components in the core wire and the covering material are appropriately controlled and the basicity BL of the covering material and the water content of the entire welding electrode are limited. Thus, a low-hydrogen-type covered arc welding electrode for high-strength Cr—Mo steels exhibiting excellent mechanical properties of the weld metal and preventing cold cracking and reheat cracking can be obtained.

What is claimed is:

1. A low-hydrogen-type covered arc welding electrode for high-strength Cr—Mo steels comprising a core wire and a covering material, characterized in that:

the contents of components in said covered arc welding electrode satisfy the following correlations:
$[Si]_w + K \times [Si]_f$: 0.35 to 2.4 weight percent,
$[Mn]_w + K \times [Mn]_f$: 0.5 to 2.0 weight percent, $[Cr]_w + K \times [Cr]_f$: 2.0 to 4.0 weight percent,
$[Mo]_w + K \times [Mo]_f$: 0.01 to 1.5 weight percent,
$[V]_w + K \times [V]_f$: 0.15 to 0.60 weight percent, and
$[C]_w + K \times [C]_f$: 0.15 weight percent or less;

said covered arc welding electrode further contains at least one group of components selected from the groups consisting of (Ti, $TiO_2$, Zr, and Hf), (Nb and Ta), Ni, Co, W, and (B and $B_2O_3$), so as to satisfy the following correlations:

$[Ti]_w + [Zr]_w + [Hf]_w + K \times ([Ti]_f + 0.02 \times [TiO_2]_f + [Zr]_f + [Hf]_f)$: 0.005 to 0.500 weight percent, $[Nb]_w + [Ta]_w + K \times ([Nb]_f + [Ta]_f)$: 0.005 to 0.200 weight percent, $[Ni]_w + K \times [Ni]_f$: 0.10 to 1.00 weight percent, $[Co]_w + K \times [Co]_f$: 0.10 to 1.00 weight percent, $[W]_w + K \times [W]_f$: 0.10 to 2.50 weight percent, and $[B]_w + K \times ([B]_f + 0.12 \times [B_2O_3]_f)$: 0.002 to 0.1 weight percent;

wherein $[X]_w$ represents a content of chemical component X in said core wire by weight percent to the total weight of said core wire, $[Y]_f$ represents a content of chemical component Y in said covering material by weight percent to the total weight of said covering material, and K equals to $t/(1-t)$ wherein t is a covering rate which represents a weight ratio of the covering material to the welding electrode per unit length; and the water content in the entire welding electrode is controlled to 50 to 600 ppm by weight, the basicity BL of said covering material expressed by the following equation is controlled to 2.0 to 8.0:

$$BL = ([CaO]_f + [MgO]_f + [BaO]_f + [CaF_2]_f + [Na_2O]_f + [K_2O]_f + 0.5 \times ([FeO]_f + [MnO]_f)) / ([SiO_2]_f + 0.5 \times ([Al_2O_3]_f + [TiO_2]_f + [ZrO_2]_f))),$$

and the P, S, N, Al and Mg contents are controlled as follows:
$[P]_w + K \times [P]_f$: 0.015 weight percent or less,
$[S]_w + K \times [S]_f$: 0.010 weight percent or less,
$[N]_w + K \times [N]_f$: 0.015 weight percent or less,
$[Al]_w + K \times [Al]_f$: 0.30 weight percent or less, and
$[Mg]_w + K \times [Mg]_f$: 0.50 weight percent or less.

* * * * *